(12) United States Patent
Relova et al.

(10) Patent No.: US 11,475,515 B1
(45) Date of Patent: Oct. 18, 2022

(54) ADVERSE ACTION METHODOLOGY FOR CREDIT RISK MODELS

(71) Applicant: Wells Fargo Bank, N.A., San Francisco, CA (US)

(72) Inventors: Marie Sally Relova, Corte Madera, CA (US); Akshay Goel, Bangalore (IN); Ying Gu, Irvine, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 16/600,183

(22) Filed: Oct. 11, 2019

(51) Int. Cl.
*G06Q 40/02* (2012.01)
*G06N 20/00* (2019.01)
*G06Q 30/02* (2012.01)

(52) U.S. Cl.
CPC ........... *G06Q 40/025* (2013.01); *G06N 20/00* (2019.01); *G06Q 30/0201* (2013.01)

(58) Field of Classification Search
CPC ...... G06Q 40/025; G06Q 40/00; G06Q 40/02; G06F 16/22
See application file for complete search history.

(56) References Cited

U.S. PATENT DOCUMENTS

| | | | | |
|---|---|---|---|---|
| 2014/0214648 A1* | 7/2014 | Merrill | ................. | G06Q 40/025 705/38 |
| 2017/0018030 A1* | 1/2017 | Crouspeyre | .......... | G06Q 40/025 |
| 2017/0070526 A1* | 3/2017 | Bailey | .................... | H04L 43/16 |
| 2017/0070527 A1* | 3/2017 | Bailey | .................. | H04L 67/535 |
| 2019/0220924 A1* | 7/2019 | Xi | ....................... | G06K 9/00523 |
| 2019/0311427 A1* | 10/2019 | Quinn | .................... | G06F 16/22 |
| 2020/0349641 A1* | 11/2020 | Fidanza | ................. | G06N 20/00 |
| 2020/0357060 A1* | 11/2020 | Dalinina | .............. | G06K 9/6232 |
| 2021/0201400 A1* | 7/2021 | Liu | ........................ | G06N 20/00 |
| 2021/0224901 A1* | 7/2021 | Jiang | ..................... | G06N 20/00 |
| 2021/0398210 A1* | 12/2021 | Mhlanga | ................ | G06N 20/00 |

OTHER PUBLICATIONS

A Credit Scoring Model based on Bayesian Network and Mutual Information IEEE from ip.com (Year: 2017).*
Prediction of loan status in commercial bank using machine learning classifier IEEE from ip.com (Year: 2015).*

\* cited by examiner

*Primary Examiner* — Bruce I Ebersman
(74) *Attorney, Agent, or Firm* — Shumaker & Sieffert, P.A.

(57) ABSTRACT

A computer-based credit evaluation system is described that uses a machine learning-based credit risk model with an adverse action methodology to assess applicant credit profiles and identify adverse action factors for credit request denials. The credit risk model is trained to assess an applicant's credit profile based on characteristics. In the case of a denial, the system compares applicant values of the characteristics against anchor values for the characteristics determined based on values from a top scoring credit profile. The system uses the credit risk model to calculate a replacement score for each of the characteristics by replacing the applicant value for the characteristic with an anchor value for the characteristic. The system ranks the characteristics based on the replacement scores, and identifies the top ranked characteristics as the adverse action factors for the denial.

10 Claims, 5 Drawing Sheets

| Characteristic | Applicant Value | Anchor Value | Definition | Average Type |
|---|---|---|---|---|
| ALL7937 | 10 | 100 | %Trade never Delq/Derog | Mean |
| ALL7348 | 20 | 0 | %Trade ever 30+ in 24 months | Mean |
| BCC5620 | 20000 | 50000 | Total OTB on bankcard | Mean |
| ALL7340 | 47 | 0 | %Trade ever 30+ | Mean |
| ALL7347 | 0 | 0 | %Trade ever 30+ in 12 months | Mean |
| ALM6160 | 400 | 1 | Worst present status on all trades | Mode |
| REH7120 | 30 | 20 | Max. utilization on revolving trades | Mean |
| ALL6250 | 1 | 1 | Worse ever status on all trades | Mode |
| IQT9417 | 1 | 0 | Total # of inquiries in 12 months | Mode |
| ALL8152 | 15 | 9996 | Months since recent 30+ | Mode |

| Scored Char | Applicant's Value | Actual Score | Best Value | Replace Score | Score Difference | Ranking |
|---|---|---|---|---|---|---|
| ALL7937 | 10% | 150 | 100% | 200 | 50 | 2 |
| ALL7348 | 20% | 150 | 0 | 225 | 75 | 1 |
| BCC5620 | 20000 | 150 | 50,000 | 175 | 25 | 3 |
| ALL7347 | 0 | 150 | 0 | 150 | 0 | 5 |
| REH7120 | 30% | 150 | 20% | 160 | 10 | 4 |

ADVERSE ACTION METHODOLOGY FOR CREDIT RISK MODELS

TECHNICAL FIELD

The present disclosure relates to computing systems, and more specifically, computing systems executing credit risk models.

BACKGROUND

Lenders use credit risk modeling to assess credit profiles of applicants and make lending decisions. Multiple characteristics of an applicant's credit profile may be input into a credit risk model, which in turn produces an overall score that is used to make the lending decision. In some examples, regulatory agencies require lenders who deny an applicant's credit request to provide notice of the reasons for the adverse action. This notice may in some cases be a required list of up to four adverse action factors for the denial. These adverse action factors may be selected from among the assessed characteristics and may be ranked to indicate where the applicant failed to meet the lender's credit requirements. Provision of the adverse action factors help the applicant understand the basis of the lending decision.

SUMMARY

In general, this disclosure describes a computer-based credit evaluation system that uses a machine learning-based credit risk model with an associated adverse action methodology to assess applicant credit profiles and identify adverse action factors for credit request denials. The machine learning-based credit risk model described herein may be trained based on a set of training data that includes values for a plurality of credit profile characteristics from a population of consumers. In this way, the credit risk model is trained to assess an applicant's credit profile based on the plurality of characteristics. In the case where a credit risk score calculated for the applicant by the credit risk model is less than a credit approval threshold defined by a lending institution, the credit evaluation system may deny the applicant's credit request and use the adverse action methodology described herein to identify one or more adverse action factors for the denial.

Unlike traditional "scorecard" credit risk models, the machine learning-based credit risk model may have a more complex structure such that that is not readily apparent what weight any of the credit profile characteristics contributes to an overall credit risk score calculated by the credit risk model. The adverse action methodology described herein relies on anchor values for the characteristics that are determined based on values from a top scoring portion of the population of consumers used to train the credit risk model. In order to compare applicant values of the characteristics against the anchor values, the credit evaluation system uses the credit risk model to calculate replacement scores for the characteristics, where each replacement score corresponds to a respective characteristic and is calculated based on a modified set of applicant values in which the applicant value for the respective characteristic is replaced with an anchor value for the respective characteristic. Once replacement scores for all of the characteristics assessed by the credit risk model are calculated, the credit evaluation system ranks the characteristics based on the replacement scores. For example, the credit evaluation system may rank the characteristics based on score differences between the original credit risk score for the applicant and the replacement scores for the characteristics. The credit evaluation system then identifies the top ranked characteristics as being the principal adverse action factors for the denial of the applicant's credit request.

As one example, this disclosure is directed to a method comprising receiving, by a computing system, a credit request of an applicant; calculating, by a credit risk model maintained by the computing system, a credit risk score for the applicant based on a credit profile of the applicant, wherein the credit profile includes applicant values for a plurality of characteristics assessed by the credit risk model; in response to a denial of the credit request of the applicant, calculating, by the credit risk model, a plurality of replacement scores for the plurality of characteristics, wherein each replacement score corresponds to a respective characteristic of the plurality of characteristics and is calculated based on a modified set of applicant values in which the applicant value for the respective characteristic is replaced with an anchor value for the respective characteristic; ranking, by the computing system, the plurality of characteristics based on the plurality of replacement scores; and outputting, by the computing system, a report identifying one or more top ranked characteristics of the plurality of characteristics as one or more principal adverse action factors for the denial of the credit request of the applicant.

As another example, this disclosure is directed to a computing system comprising a memory, a credit risk model, and one or more processors in communication with the memory. The one or more processors are configured to receive a credit request of an applicant; calculate, using the credit risk model, a credit risk score for the applicant based on a credit profile of the applicant, wherein the credit profile includes applicant values for a plurality of characteristics assessed by the credit risk model; in response to a denial of the credit request of the applicant, calculate, using the credit risk model, a plurality of replacement scores for the plurality of characteristics, wherein each replacement score corresponds to a respective characteristic of the plurality of characteristics and is calculated based on a modified set of applicant values in which the applicant value for the respective characteristic is replaced with an anchor value for the respective characteristic; rank the plurality of characteristics based on the plurality of replacement scores; and output a report identifying one or more top ranked characteristics of the plurality of characteristics as one or more principal adverse action factors for the denial of the credit request of the applicant.

In a further example, this disclosure is directed to a computer readable medium comprising instructions that when executed cause one or more processors to: receive a credit request of an applicant; calculate, using a credit risk model, a credit risk score for the applicant based on a credit profile of the applicant, wherein the credit profile includes applicant values for a plurality of characteristics assessed by the credit risk model; in response to a denial of the credit request of the applicant, calculate, using the credit risk model, a plurality of replacement scores for the plurality of characteristics, wherein each replacement score corresponds to a respective characteristic of the plurality of characteristics and is calculated based on a modified set of applicant values in which the applicant value for the respective characteristic is replaced with an anchor value for the respective characteristic; rank the plurality of characteristics based on the plurality of replacement scores; and output a report identifying one or more top ranked characteristics of the plurality of characteristics as one or more principal adverse action factors for the denial of the credit request of the applicant.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
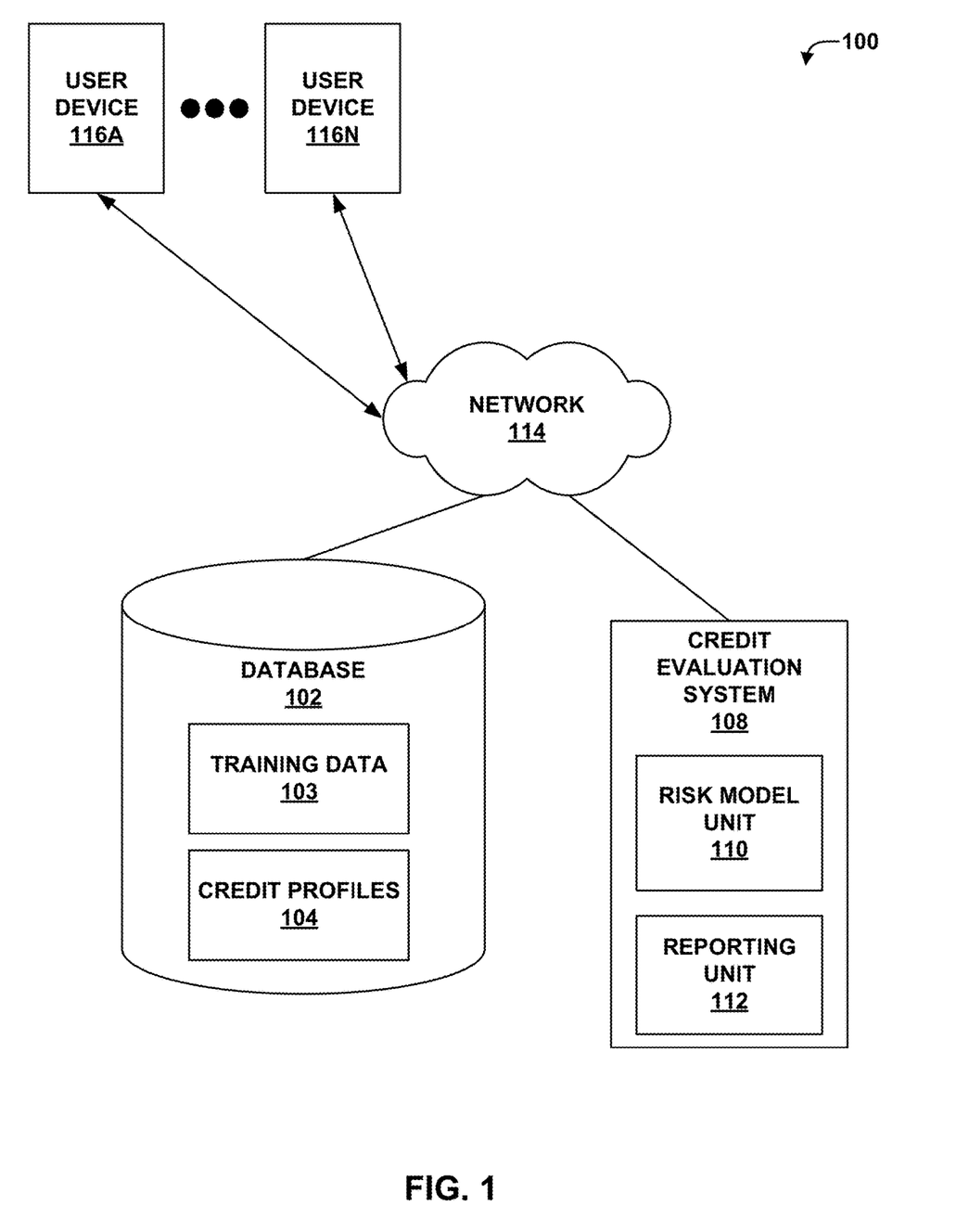
FIG. 1 is a block diagram illustrating an example system that includes a credit evaluation system configured to perform an assessment of an applicant's credit profile, in accordance with the techniques of this disclosure.

FIG. 1 is a block diagram illustrating an example system 100 for performing an assessment of an applicant's credit profile. System 100 illustrates a plurality of user devices 116A-116N, (collectively, "plurality of users 116") that respective applicants may use to apply for or request credit from a lending institution. The lending institution may use a credit evaluation system 108 that communicates with user devices 116 and database 102 via network 114. As illustrated, database 102 includes credit profiles 104 of a plurality of applicants. Network 114 may comprise a private network including, for example, a private network associated with an organization, or may comprise a public network, such as the Internet. Although illustrated in FIG. 1 as a single entity, in other examples network 114 may comprise a combination of public and/or private networks.

In the example of FIG. 1, credit evaluation system 108 includes a risk model unit 110 and a reporting unit 112. Risk model unit 110 is configured to use a credit risk model to assess an applicant's credit profile and, if the applicant's credit request is denied, determine adverse action factors for the denial. For example, an applicant may use their computing device, e.g., user device 116A, to send a credit request to the lending institution's credit evaluation system 108 via network 114. Credit evaluation system 108 may retrieve the applicant's credit profile from credit profiles 104 stored in database 102 and analyze the applicant's credit profile with respect to multiple characteristics. Reporting unit 112 may generate a report indicating whether the applicant's credit request is approved or denied and, if denied, further indicating one or more adverse action factors for the denial. Credit evaluation system 108 may then transmit the report to user device 116A of the applicant via network 114 and/or to a regulatory agency.

Database 102 may be a data structure for storing data related to the system 100 including credit profiles 104. Database 102 may be stored by any suitable party and in any suitable location according to particular needs. For example, database 102 may be stored and maintained by the lending institution that includes credit evaluation system 108, another institution associated with system 100, or by a third-party vendor that stores and maintains data. Although illustrated as a single database 102, any suitable number of databases may be used for storing the data described according to particular needs. Although shown as being separate from credit evaluation system 108, in certain examples, database 102 may be stored and executed within credit evaluation system 108. As one example, database 102 may be managed by a credit reporting agency or credit bureau that captures, updates, and stores credit histories, e.g., credit profiles 104, on a majority of consumers. In other examples, database 102 may be managed by a specific lending institution and store credit profiles 104 for its customers and potential customers.

Credit evaluation system 108 may be associated with a lending institution including, for example, a bank. In some examples, credit evaluation system 108 may be a centralized computing device configured to execute risk model unit 110 and reporting unit 112 for analysis of an applicant's credit profile. Credit evaluation system 108 may comprise a cluster of one or more computers, workstations, servers, and the like. Credit evaluation system 108 may be physically or virtually included within an internal network of the lending institution. Alternatively, credit evaluation system 108 may be physically or virtually included in a network hosted by a third-party vendor. For example, a vendor of the lending institution may store and maintain risk model unit 110 and/or reporting unit 112 for the lending institution and/or may provide the functions of risk model unit 110 and/or reporting unit 112 as a service to the lending institution.

Upon receipt of a credit request from an applicant via one of user devices 116, risk model unit 110 of credit evaluation system 108 retrieves the one of credit profiles 104 from database 102 for the applicant. For example, credit evaluation system 108 may send a query to database 102 for the particular one of credit profiles 104 associated with the applicant. In other examples, risk model unit 110 may receive the applicant's credit profile directly from the one of user devices 116 of the applicant. Risk model unit 110 uses a credit risk model to assess the applicant's credit profile according to multiple characteristics, which were used to build the credit risk model being applied. As some specific examples, the characteristics may include delinquency history, collections history, number of credit inquiries, bankcard balance, maximum credit amount, and the like. Based on the credit risk model, risk model unit 110 determines an overall credit risk score for the applicant that is used to make the lending decision.

In the case of a credit request denial, risk model unit 110 further determines one or more adverse action factors for the denial. These adverse action factors may be selected from among the characteristics of the applicant's credit profile that are assessed by the credit risk model and ranked to indicate an ordered impact of the various characteristics upon the applicant's credit risk score. Reporting unit 112 generates a report indicating whether the applicant's credit request is approved or denied and, if denied, further indicating one or more principal adverse action factors for the denial. In some examples, regulatory agencies require lending institutions that deny an applicant's credit request to provide up to four principal adverse action factors for the denial.

Conventionally, many credit risk models are in the form of "scorecards" where an applicant's credit profile is reviewed on multiple, e.g., 6 to 12, characteristics and, for each possible response, there is an associated number of points. The points for each characteristic are added up to create the overall credit risk score. The applicant is approved or denied depending on whether the overall credit risk score exceeds a credit approval threshold set by the lending institution. For models of this type, there are typically two anchor points for each characteristic that may be used for determining the principal adverse action factors: maximum weight or neutral weight. The maximum weight is defined as the most favorable points an applicant could possible achieve, and the neutral weight is defined as the score that an applicant could achieve that neither rewards nor penalizes that applicant.

One method for generating the adverse action factors according to a scorecard credit risk model is to calculate how the points achieved by the applicant deviate from the maximum points for each characteristic in the model. The higher the deviation or distance between the applicant's score and the maximum weight for a given characteristic, the more that characteristic affected the applicant's overall score. As such, in the scorecard credit risk model, the distances are ranked from highest to lowest and the characteristics with the top or largest distances may be identified as the principal adverse action factors for a denial of the applicant's credit request. A similar process for identifying the principal adverse action factors using the distances between the applicant's score and the neutral weight for each characteristic is also available. In some cases, lending institutions may calculate overall average scores for each characteristic and use the "distance from average" as another variant in the credit evaluation process. In general, many variations of the scorecard credit risk model are recognized as acceptable techniques by regulatory agencies that oversee lending institutions and other financial institutions.

The disclosure generally describes techniques for assessing an applicant's credit profile using a machine learning-based credit risk model to determine whether the applicant's credit request is approved or denied and, if denied, using an adverse action methodology to identify one or more principal adverse action factors for the denial. In general, a computing system uses a machine learning algorithm to build a model based on a set of training data such that the model "learns" how to make predictions, inferences, or decisions to perform a specific task without being explicitly programmed to perform the specific task. Once trained, the computing system applies or executes the trained model to perform the specific task based on new data. Machine learning-based credit risk models may have a more complex structure than the scorecard credit risk models described above. Examples of machine learning algorithms and/or computer frameworks for machine learning algorithms used to build the models include a gradient boosting algorithm, a random forest algorithm, or an artificial neural network (ANN), such as a convolutional neural network (CNN). For example, a gradient boosting model may comprise a series of trees where each subsequent tree minimizes a predictive error of the preceding tree.

Returning to the example of FIG. 1, credit evaluation system 108 or another computing system may be configured to build a machine learning-based credit risk model based on training data 103 that includes characteristic values for an entire population of consumers. Although training data 103 is illustrated in FIG. 1 as being stored in database 102 along with credit profiles 104 of current credit applicants, in other examples training data 103 may be stored elsewhere. In one example, training data 103 and the credit risk model built from training data 103 may be static with occasional manual updates (e.g., annual replacement of training data 103 and re-building of the model). In other examples, the credit risk model may comprise a self-learning model that receives feedback based on new data that is processed and included in training data 103.

Once the model is trained, risk model unit 110 may be configured to apply or execute the machine learning-based credit risk model to assess an applicant's credit profile according to the applicant's actual values for the credit profile characteristics assessed by the credit risk model. The output of the machine learning-based credit risk model provides the applicant's overall credit risk score, which is then used to determine whether to approve or deny the applicant's credit request. The adverse action methodology associated with the credit risk model is used to identify one or more principal adverse action factors in the case of a denial of the applicant's credit request. When using a machine learning-based model for assessing credit profiles, the credit profile characteristics may be used by the model in more complex ways than when using a scorecard credit risk model (e.g., a single characteristic may be relied upon in different portions of a machine learning-based model's evaluation, whereas the characteristic is used in just a single portion of a scorecard model's evaluation), such that is not readily apparent what weight any characteristic contributes to an overall credit risk score calculated by a machine learning-based model. As such, this makes it difficult to identify a maximum or neutral weight for a given characteristic across a population, and difficult to identify a deviation from a maximum or neutral weight for a particular applicant. These difficulties thus pose challenges for calculating principal adverse action factors when using machine learning-based models to evaluate credit requests.

According to techniques of this disclosure, these difficulties are overcome. Risk model unit 110 applies the machine learning-based credit risk model trained based on training data 103 to determine an anchor value or "best value" for each characteristic assessed by the credit risk model from the population of consumers represented in training data 103. Instead of calculating the significance of a given characteristic by comparing the weight that a given applicant's characteristic value contributes against a maximum or neutral weight for that characteristic, as is done for scorecard credit risk models, the machine learning-based credit risk model instead relies on a profile of a portion of the population represented in training data 103 who achieve the highest overall credit risk scores. For example, risk model unit 110 may use an average, e.g., a mean or mode, of the values of a given characteristic from the top scoring portion of the overall population. In one example, the top scoring portion may comprise the top scoring 1% of the overall population. The average characteristic values associated with this top scoring population, i.e., the "best values," are then used as the anchor values for identifying the principal adverse action factors for an applicant's credit request denial. In this way, the anchor values for the characteristics assessed by the credit risk model are determined from the credit risk model itself In order to identify the principal adverse action factors for an applicant based on the anchor values, risk model unit 110 first uses the machine learning-based credit risk model to compute the applicant's actual overall credit risk score based on the applicant's actual values for the characteristics assessed by the credit risk model, as described above. For a given characteristic, risk model unit 110 then replaces the applicant's actual value for the given characteristic with the anchor value for the given characteristic, while keeping the applicant's actual values for the other characteristics static. Risk model unit 110 then re-applies the machine learning-based credit risk model to compute a new theoretical overall credit risk score (referred to as a "replacement score") for the applicant based on the modification of the applicant value for the given characteristic. In this way, the machine learning-based credit risk model applied by risk model unit 110 measures how much better the applicant would have scored if the applicant had the anchor value for the given characteristic. Risk model unit 110 performs the above modification of the applicant value for each of the characteristics assessed by the credit risk model and, thus, computes a replacement score for each of the characteristics.

Risk model unit 110 then ranks the characteristics assessed by the credit risk model based on the replacement scores computed for the characteristics. For example, risk model unit 110 compares the applicant's actual overall score with the replacement score for each of the characteristics. Risk model unit 110 may compute the score difference between the actual credit risk score and the replacement score for each characteristic and rank the characteristics in order of descending magnitude of the score difference. The characteristics with the largest score differences between the actual credit risk score and the replacement scores may then be identified as the principal adverse action factors for a denial of the applicant's credit request. Risk model unit 110 may output either the ranking of the characteristics or the score differences between the applicant's actual credit risk score and the replacement scores for the characteristics to reporting unit 112. In the case where the applicant's credit request is denied, reporting unit 112 may generate an adverse action report that includes the principal adverse action factors for the denial, as determined based on the information reporting unit 112 receives from risk model unit 110. Reporting unit 112 may then output the report for transmission to the one of user devices 116 used by the applicant.

Figure 2:
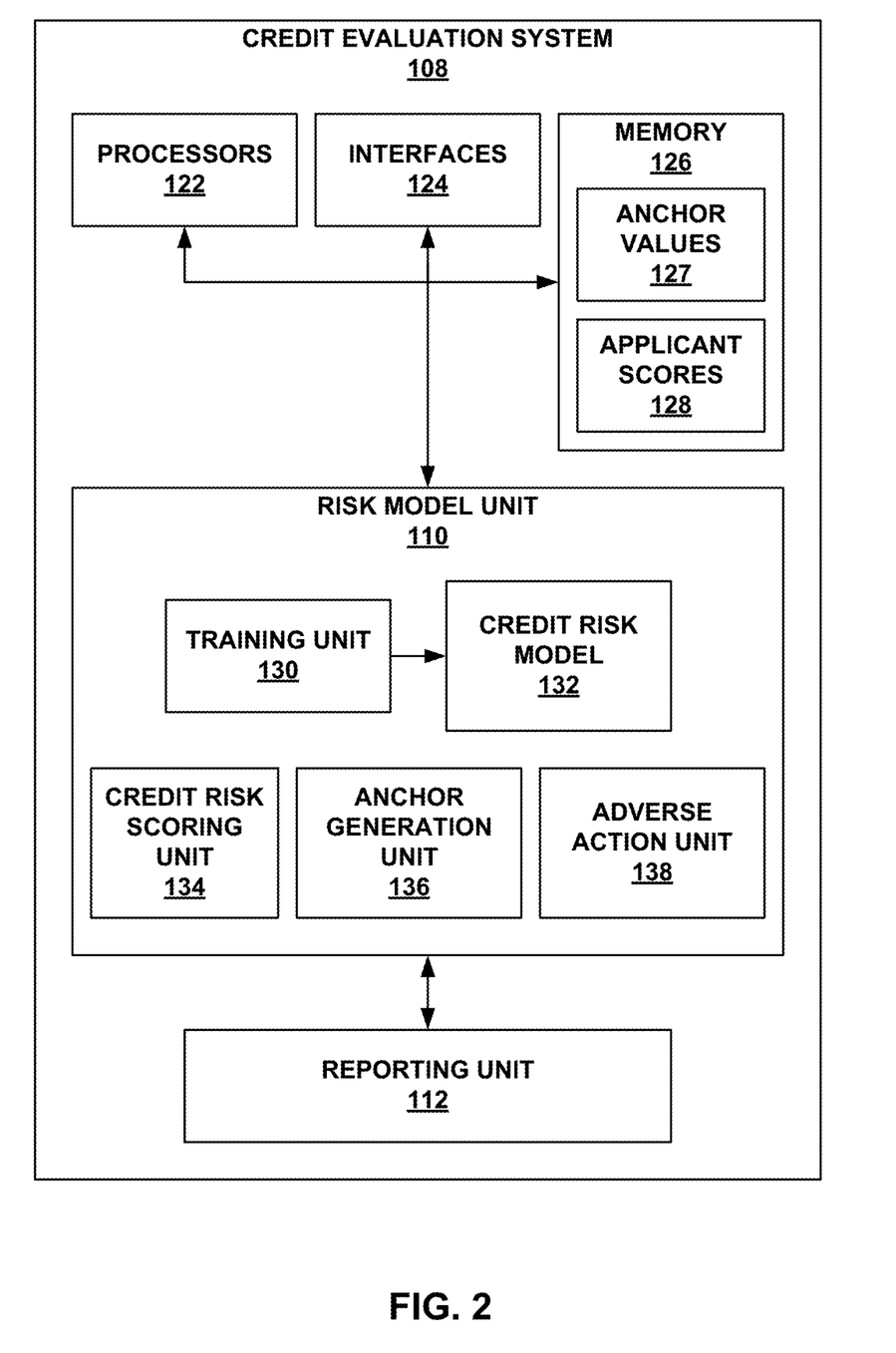
FIG. 2 is a block diagram illustrating an example credit evaluation system, in accordance with the techniques of this disclosure.

FIG. 2 is a block diagram illustrating an example credit evaluation system 108, in accordance with the techniques of this disclosure. The architecture of credit evaluation system 108 illustrated in FIG. 2 is shown for exemplary purposes only. Credit evaluation system 108 should not be limited to the illustrated example architecture. In other examples, credit evaluation system 108 may be configured in a variety of ways.

Credit evaluation system 108 is configured to receive a credit request of an applicant and apply a machine learning-based credit risk model 132 to score the applicant's credit profile to approve or deny the credit request. In the case of a denial of the credit request, credit evaluation system 108 is further configured to apply an adverse action methodology associated with the credit risk model 132 to identify adverse action factors for the denial. The adverse action methodology described herein relies on anchor values determined as "best values" for the characteristics from a top scoring credit profile. According to the adverse action methodology, credit evaluation system 108 applies credit risk model 132 to re-score the applicant's credit profile for each characteristic using the anchor value for the given characteristic to determine how much better the applicant would have scored if the applicant had the anchor value for the given characteristic. Based on the score differences, credit evaluation system 108 identifies the most impactful characteristics as the principal adverse action factors.

Credit evaluation system 108 may be implemented as any suitable computing system, such as one or more server computers, workstations, mainframes, appliances, cloud computing systems, and/or other computing systems that may be capable of performing operations and/or functions described in accordance with one or more aspects of the present disclosure. In some examples, credit evaluation system 108 represents a cloud computing system, server farm, and/or server cluster (or portion thereof) that provides services to client devices and other devices or systems. In other examples, credit evaluation system 108 may represent or be implemented through one or more virtualized compute instances (e.g., virtual machines, containers) of a data center, cloud computing system, server farm, and/or server cluster.

As shown in the example of FIG. 2, credit evaluation system 108 includes one or more processors 122, one or more interfaces 124, and memory 126. Credit evaluation system 108 also includes risk model unit 110 and reporting unit 112, which may be implemented as program instructions and/or data stored in memory 126 and executable by processors 122. Memory 126 may also store an operating system (not shown) executable by processors 122 to control the operation of components of credit evaluation system 108. The components, units or modules of credit evaluation system 108 are coupled (physically, communicatively, and/or operatively) using communication channels for inter-component communications. In some examples, the communication channels may include a system bus, a network connection, an inter-process communication data structure, or any other method for communicating data.

Processors 122, in one example, may comprise one or more processors that are configured to implement functionality and/or process instructions for execution within credit evaluation system 108. For example, processors 122 may be capable of processing instructions stored by memory 126. Processors 122 may include, for example, microprocessors, digital signal processors (DSPs), application specific integrated circuits (ASICs), field-programmable gate array (FPGAs), or equivalent discrete or integrated logic circuitry, or a combination of any of the foregoing devices or circuitry.

Credit evaluation system 108 may utilize interfaces 124 to communicate with external systems via one or more networks, e.g., network 114 from FIG. 1. Interfaces 124 may be network interfaces (such as Ethernet interfaces, optical transceivers, radio frequency (RF) transceivers, Wi-Fi or Bluetooth radios, or the like), telephony interfaces, or any other type of devices that can send and receive information. In some examples, credit evaluation system 108 utilizes interfaces 124 to wirelessly communicate with external systems, e.g., database 102 and/or user devices 116 from FIG. 1.

Memory 126 may be configured to store information within credit evaluation system 108 during operation. Memory 126 may include a computer-readable storage medium or computer-readable storage device. In some examples, memory 126 include one or more of a short-term memory or a long-term memory. Memory 126 may include, for example, random access memories (RAM), dynamic random access memories (DRAM), static random access memories (SRAM), magnetic discs, optical discs, flash memories, or forms of electrically programmable memories (EPROM) or electrically erasable and programmable memories (EEPROM). In some examples, memory 126 is used to store program instructions for execution by processors 122.

Memory 126 may be used by software or applications running on credit evaluation system 108 (e.g., risk model unit 110 and reporting unit 112) to temporarily store information during program execution. For example, memory 126 stores anchor values 127 and applicant scores 128 during execution of risk model unit 110.

In the example of FIG. 2, risk model unit 110 includes training unit 130, credit risk model 132, credit risk scoring unit 134, anchor generation unit 136, and adverse action unit 138. According to the techniques described in this disclosure, credit risk model 132 is built using a machine learning algorithm or framework configured to be executed by processors 122. For example, credit risk model 132 may be built using a gradient boosting algorithm, a random forest algorithm, or an ANN such as a CNN. Training unit 130 is configured to train the machine learning algorithm or framework of credit risk model 132 to make predictions, inferences, or decisions to calculate a credit risk score from an applicant's credit profile. For example, training unit 130 may train the machine learning algorithm of credit risk model 132 based on training data that includes credit profile characteristic values for an entire population of consumers, e.g., training data 103 in database 102 from FIG. 1.

Training unit 130 may periodically (e.g., monthly, bi-monthly, yearly, or the like) re-train credit risk model 132 based on an updated set of training data. The updated set of training data may include values for additional characteristics to be included in a new version of the credit risk model. Additionally, or alternatively, the updated set of training data may include characteristic values for the applicants that were scored during the time since credit risk model 132 was last trained by training unit 130. For example, the credit risk scores for new applicants calculated by credit risk model 132 itself may be used as feedback to update training data 103 for a future re-training of credit risk model 132.

In general, machine learning-based credit risk models may have a more complex structure than scorecard credit risk models described above. Machine learning-based models tend to be dense and opaque such that it may not be readily apparent how the different characteristics of the applicant's credit profile are used within credit risk model 132 to calculate the applicant's credit risk score. For example, credit risk model 132 may be a gradient boosting model that is comprised of a series of trees where each subsequent tree minimizes the predictive error of the preceding tree. As one example, credit risk model 132 may be built based on over 60different credit profile characteristics for each member of the population included in training data 103. In this example, credit risk model 132 may include approximately 160 trees where each tree is up to 6 levels deep and where at least a subset of the credit profile characteristics show up with different breaks in multiple different trees. In other examples, credit risk model 132 may be built based on more or fewer characteristics resulting in a different tree structure.

The complex structure of machine learning-based credit risk model 132 may make it difficult to identify what weight any of the characteristics contributes to the overall credit risk score calculated by credit risk model 132 and, thus, difficult to identify the principal adverse action factors for a denial of the applicant's credit profile assessed by credit risk model 132. The adverse action methodology described herein is capable of identifying the adverse action factors from the actual credit risk model used to deny the applicant's credit request.

Once credit risk model 132 is trained, anchor generation unit 136 is configured to determine anchor values 127 or "best values" for the credit profile characteristics that were used to build credit risk model 132. Anchor generation unit 136 may determine anchor values 127 based on the characteristic values from a top scoring portion of the population of consumers represented in training data 103.

As one example, anchor generation unit 136 may apply credit risk model 132 to calculate credit risk scores for each member of the population based on the characteristic values for the respective member. Anchor generation unit 136 may then generate a profile of the top scoring portion of the population from which to determine anchor values 127. For example, anchor generation unit 136 may generate a profile for the top scoring 1% of the population based on the credit risk scores for the members of the population. In other examples, anchor generation unit 136 may use a larger or smaller portion of the population. The top scoring portion should be selected to only include those members of the population having credit risk scores that are high enough to essentially be guaranteed to never be declined for credit. As an additional consideration, the top scoring portion should be selected to include a small enough number of members so as to avoid an occurrence of local maxima and/or local minima of the characteristic values within the portion of the population. A smaller portion of the population is more likely to converge on true average instead of converging toward the local extrema.

Anchor generation unit 136 uses the top scoring portion of the population to determine anchor values 127 or "best values" for the characteristics assessed by credit risk model 132. For example, anchor generation unit 136 computes an average value for each of the characteristics from the values of the members included in the top scoring portion of the population. Depending on the type of variable defined for the respective characteristic, anchor generation unit 136 may determine a mean or a mode of the values for the respective characteristics from the top scoring portion of the population. In the example of a first characteristic that comprises a continuous variable, anchor generation unit 136 determines a mean of the values for the first characteristic from the top scoring portion of the population to determine the anchor value for the first characteristic. In the example of a second characteristic that comprises a categorical variable, anchor generation unit 136 determines a mode (i.e., most often occurring) of the values for the second characteristic from the top scoring portion of the population to determine the anchor value for the second characteristic. Anchor generation unit 136 stores the determined anchor values 127 for credit risk model 132 in memory 126. Anchor values 127 are static values associated with credit risk model 132 such that anchor values 127 may only be updated when credit risk model 132 is re-trained. Specific examples of credit profile characteristics and anchor values for the characteristics are described with respect to FIG. 3A.

After credit risk model 132 is trained and anchor values 127 are determined, credit scoring unit 134 may apply credit risk model 132 to assess new data in the form of applicant values of the characteristics from an applicant's credit profile, e.g., one of credit profiles 104 in database 102 from FIG. 1. More specifically, risk model unit 110 receives a credit request from a user device of an applicant, e.g., one of user devices 116 from FIG. 1, via interfaces 124. In response to the credit request, credit risk scoring unit 134 may retrieve the one of credit profiles 104 for the applicant from database 102. In other examples, credit risk scoring unit 134 may receive the applicant's credit profile directly from the one of user devices 116 and store the applicant's credit profile in memory 126.

Credit scoring unit 134 applies credit risk model 132 to calculate a credit risk score for the applicant based on the applicant values of the characteristics from the applicant's credit profile. Credit scoring unit 134 may store the credit risk score for the applicant as one of applicant scores 128 in memory 126. Based on the applicant's credit risk score, risk model unit 110 may determine whether to approve or deny the applicant's credit request. For example, risk model unit 110 may approve the credit request if the applicant's credit risk score is greater than or equal to a credit approval threshold defined by the lending institution from which the credit is being requested. Conversely, risk model unit 110 may deny the credit request if the applicant's credit risk score is less than the credit approval threshold.

In the case of a denial of the applicant's credit request, risk model unit 110 uses adverse action unit 138 to identify one or more principal adverse action factors for denying the applicant's credit request. In accordance with the techniques of this disclosure, adverse action unit 138 is configured to apply credit risk model 132 to calculate theoretical replacement scores based on anchor values 127 for each of the characteristics assessed by credit risk model 132 to determine how much better the applicant would have scored if the applicant had the anchor value for the respective characteristic.

More specifically, adverse action unit 138 creates a modified set of applicant values for each characteristic assessed by credit risk model 132 in which the applicant value for the respective characteristic is replaced with the one of anchor values 127 for the respective characteristic while keeping the applicant values for the other characteristics static. Adverse action unit 138 applies credit risk model 132 to calculate a replacement score for the respective characteristic based on the modified set of applicant values. In some examples, adverse action unit 138 may store the replacement score for the respective characteristics as one of applicant scores 128 in memory 126. Adverse action unit 138 computes a score difference between the applicant's actual credit risk score and the replacement score for respective characteristic.

In other words, for each characteristic, the modified set of applicant values is created as though the applicant had achieved the "best value" for that particular characteristic. The replacement score, or more specifically the score difference between the applicant's actual credit risk score and the replacement score for the particular characteristic, reflects how much better the applicant would have scored if the applicant had achieved the "best value" for that particular characteristic. In this way, adverse action unit 138 is able to determine which of the characteristics had the most impact or weight in denying the applicant's credit request and identify the most impactful characteristics as the principal adverse action factors for the applicant's denial. For example, after computing score differences for all of the characteristics assessed by credit risk model 132, adverse action unit 138 ranks the characteristics in order of descending magnitude of the score difference. The characteristics with the largest score differences between the actual credit risk score and the replacement scores may be identified as the principal adverse action factors for the denial of the applicant's credit request. A specific example of characteristics ranked by score difference magnitude is described with respect to FIG. 3B.

Risk model unit 110 may output either the ranking of the characteristics or the score differences between the applicant's actual credit risk score and the replacement scores for the characteristics to reporting unit 112. Reporting unit 112 may generate and output a report indicating whether the applicant's credit request is approved or denied. In the case where the applicant's credit request is denied, reporting unit 112 generates an adverse action report that includes the principal adverse action factors for the denial as determined by adverse action unit 138. Reporting unit 112 may then output the adverse action report for transmission via interfaces 124 to the one of user devices 116 of the applicant and/or for storage in the one of credit profiles 104 of the applicant in database 102 from FIG. 1. In other examples, reporting unit 112 may output the adverse action report for transmission via interfaces 124 to one or more regulatory agencies.

Figure 3A:
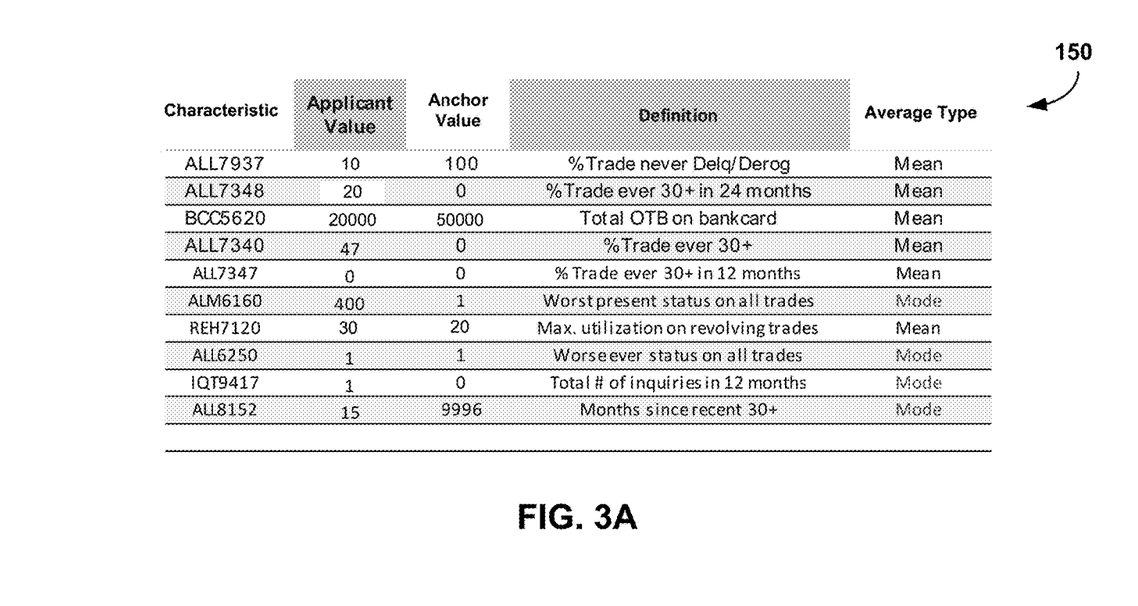
FIGS. 3A & 3B are charts respectively illustrating example applicant values and anchor values for multiple characteristics, and an example ranking of the characteristics based on scoring differences between the applicant values and the anchor values, in accordance with the techniques of this disclosure.
Figure 3B:
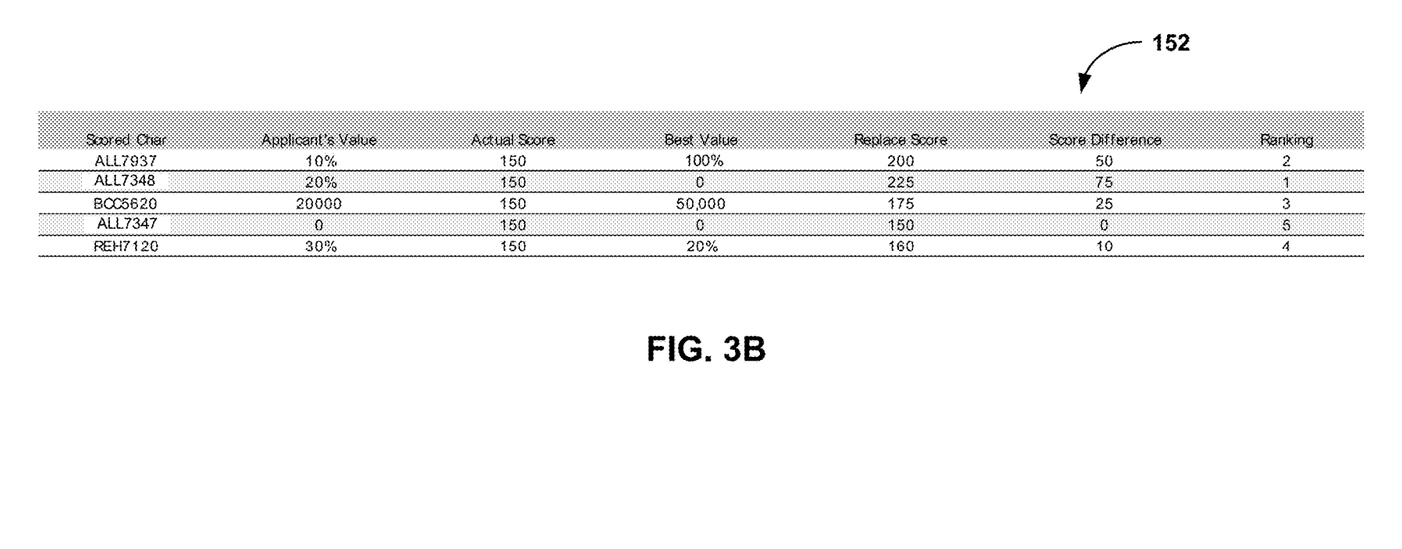

FIGS. 3A & 3B are charts respectively illustrating example applicant values and anchor values for multiple characteristics, and an example ranking of the characteristics based on scoring differences between the applicant values and the anchor values, in accordance with the techniques of this disclosure.

FIG. 3A shows chart 150 including a set of credit profile characteristics and applicant values, anchor values (i.e., "best values"), definitions, and an average type (e.g., mean or mode) for the set of credit profile characteristics. The credit profile characteristics include values related to delinquency history, collections history, number of credit inquiries, bankcard balance, maximum credit amount, and the like. Although chart 150 includes ten specific examples of credit profile characteristics, it should be understood that these ten characteristics are merely exemplary, and the machine learning-based credit risk model described herein may be built to assess more than these ten characteristics. For example, as described above, the machine learning-based credit risk model may be built based on more than 60 characteristics, more than 100 characteristics, or more than 500 characteristics.

As a first example, characteristic ALL7937 is defined as a percent of trades never delinquent or derogatory, which is a continuous variable such that a mean average may be used to determine the anchor value for ALL7937. In the illustrated example, the anchor value for ALL7937 is determined to be 100% and the applicant value for ALL7937 is 10%.

As a second example, characteristic ALL7348 is defined as a percent of trades ever 30-days delinquent in 24 months, which is a continuous variable such that a mean average may be used to determine the anchor value for ALL7348. In the illustrated example, the anchor value for ALL7348 is determined to be 0% and the applicant value for ALL7348 is 20%.

As a third example, characteristic BCC5620 is defined as a total "open to buy" balance on a bankcard, which is a continuous variable such that a mean average may be used to determine the anchor value for BCC5620. In the illustrated example, the anchor value for BCC5620 is determined to be $50,000 and the applicant value for BCC5620 is $20,000.

As a fourth example, characteristic ALL7340 is defined as a percent of trades ever 30-days delinquent, which is a continuous variable such that a mean average may be used to determine the anchor value for ALL7340. In the illustrated example, the anchor value for ALL7340 is determined to be 0% and the applicant value for ALL7340 is 47%.

As a fifth example, characteristic ALL7347 is defined as a percent of trades ever 30-days delinquent in 12 months, which is a continuous variable such that a mean average may be used to determine the anchor value for ALL7347. In the illustrated example, the anchor value for ALL7347 is determined to be 0% and the applicant value for ALL7347 is 0%.

As a sixth example, characteristic ALM6160 is defined as a worst present status on all trades, which is a categorical variable such that a mode average may be used to determine the anchor value for ALM6160. The value assigned for ALM6160 is based on which status category an applicant falls into. For example, accounts that are too new to have a worst present status are assigned a value of 0, no delinquency is given a value of 1, a 30-day delinquency is given a value of 30, a 60-day delinquency is given a value of 60, a 90-day delinquency is given a value of 90, and so on up to a maximum value of 400. In the illustrated example, the anchor value for ALM6160 is determined to be 1 (no delinquency) and the applicant value for ALM6160 is 400 (at least 400-days delinquent).

As a seventh example, characteristic REH7120 is defined as a maximum utilization on revolving trades, which is a continuous variable such that a mean average may be used to determine the anchor value for REH7120. In the illustrated example, the anchor value for REH7120 is determined to be 20% and the applicant value for REH7120 is 30%.

As an eighth example, characteristic ALL6250 is defined as a worst ever status on all trades, which is a categorical variable such that a mode average may be used to determine the anchor value for ALL6250. The categorical values for ALL6250 may be the same as those defined for ALM6160 described above. In the illustrated example, the anchor value for ALL6250 is determined to be 1 (no delinquency) and the applicant value for ALL6250 is 1 (no delinquency).

As a ninth example, characteristic IQT9417 is defined as a total number of inquiries in 12 months, which is a categorical variable such that a mode average may be used to determine the anchor value for IQT9417. The categorical values for IQT9417 may be assigned such that no inquiries is given a value of 0, one inquiry is given a value of 1, two inquiries is given a value of 2, and so on up to a maximum value, e.g., more than four inquiries is given a value of 5. In the illustrated example, the anchor value for IQT9417 is determined to be 0 (no inquiries) and the applicant value for IQT9417 is 1 (one inquiry).

As a tenth example, characteristic ALL8152 is defined as a number of months since a most recent 30-day delinquency, which is a categorical variable such that a mode average may be used to determine the anchor value for ALL8152. The categorical values for ALL8152 may be assigned such that one month is given a value of 1, two months is given a value of 2, three months is given a value of 3, and so on up to a maximum value, e.g., more than 9999 months is given a value of 9999. In the illustrated example, the anchor value for ALL8152 is determined to be 9996 (9996 months) and the applicant value for ALL8152 is 15 (15 months).

FIG. 3B shows chart 152 including a set of scored credit profile characteristics and applicant values, an applicant's actual credit risk score, anchor values (i.e., "best values"), replacement scores, score differences, and rankings of the set of scored credit profile characteristics. Although chart 152 includes five specific examples of scored credit profile characteristics, it should be understood that these five characteristics are merely exemplary, and the adverse action methodology described herein may score and rank more than these five characteristics. For example, the adverse action methodology may score and rank all of the characteristics assessed by credit risk model, e.g., more than 60 characteristics, more than 100 characteristics, or more than 500 characteristics. In some examples, although the adverse action methodology may rank all of the characteristics of the credit risk model, only the four or five top ranked characteristics may be identified as the principal adverse action factors.

For each of the scored characteristics included in chart 152, the applicant's actual credit risk score is calculated using the machine learning-based credit risk model described herein based on the applicant values for the characteristics included in the applicant's credit profile. In the example illustrated in FIG. 3B, the applicant's actual credit risk score is equal to 150.

As a first example, characteristic ALL7937 (i.e., percent of trades never delinquent or derogatory) has an anchor value of 100% and an applicant value of 10%. To determine how much better the applicant would have scored if the applicant had achieved the "best value" for ALL7937, the applicant value of 10% is replaced with the anchor value of 100% while the applicant values for the other characteristics remain static, and the credit risk model is applied to the modified set of applicant values to calculate a replacement score of 200. In this example, the score difference between the applicant's actual score and the replacement score for ALL7937 is 50.

As a second example, characteristic ALL7348 (i.e., percent of trades ever 30-days delinquent in 24 months) has an anchor value of 0% and an applicant value of 20%. To determine how much better the applicant would have scored if the applicant had achieved the "best value" for ALL7348, the applicant value of 20% is replaced with the anchor value of 0% while the applicant values for the other characteristics remain static, and the credit risk model is applied to the modified set of applicant values to calculate a replacement score of 225. In this example, the score difference between the applicant's actual score and the replacement score for ALL7348 is 75.

As a third example, characteristic BCC5620 (i.e., total "open to buy" balance on a bankcard) has an anchor value of $50,000 and an applicant value of $20,000. To determine how much better the applicant would have scored if the applicant had achieved the "best value" for BCC5620, the applicant value of $20,000 is replaced with the anchor value of $50,000 while the applicant values for the other characteristics remain static, and the credit risk model is applied to the modified set of applicant values to calculate a replacement score of 175. In this example, the score difference between the applicant's actual score and the replacement score for BCC5620 is 25.

As a fourth example, characteristic ALL7347 (i.e., percent of trades ever 30-days delinquent in 12 months) has an anchor value of 0% and an applicant value of 0%. To determine how much better the applicant would have scored if the applicant had achieved the "best value" for ALL7347, the applicant value of 0% is replaced with the anchor value of 0% while the applicant values for the other characteristics remain static, and the credit risk model is applied to the modified set of applicant values to calculate a replacement score of 150. In this example, the score difference between the applicant's actual score and the replacement score for ALL7347 is 0.

As a fifth example, characteristic REH7120 (i.e., maximum utilization on revolving trades) has an anchor value of 20% and an applicant value of 30%. To determine how much better the applicant would have scored if the applicant had achieved the "best value" for REH7120, the applicant value of 30% is replaced with the anchor value of 20% while the applicant values for the other characteristics remain static, and the credit risk model is applied to the modified set of applicant values to calculate a replacement score of 160. In this example, the score difference between the applicant's actual score and the replacement score for REH7120 is 10.

The scored characteristics are ranked in order of descending magnitude of the score differences to determine which of the characteristics had the most impact or weight in denying the applicant's credit request. As illustrated in FIG. 3B, characteristic ALL7348 (i.e., percent of trades ever 30-days delinquent in 24 months) is ranked first as having the largest score difference of 75. ALL7937 is ranked second with the score difference of 50. BCC5620 is ranked third with the score difference of 25. REH7120 is ranked fourth with a score different of 10. ALL7347 is ranked fifth with the score difference of 0. In some examples, an adverse action report may include at least the four top ranked characteristics with their ordered rankings as the principal adverse action factors.

Figure 4:
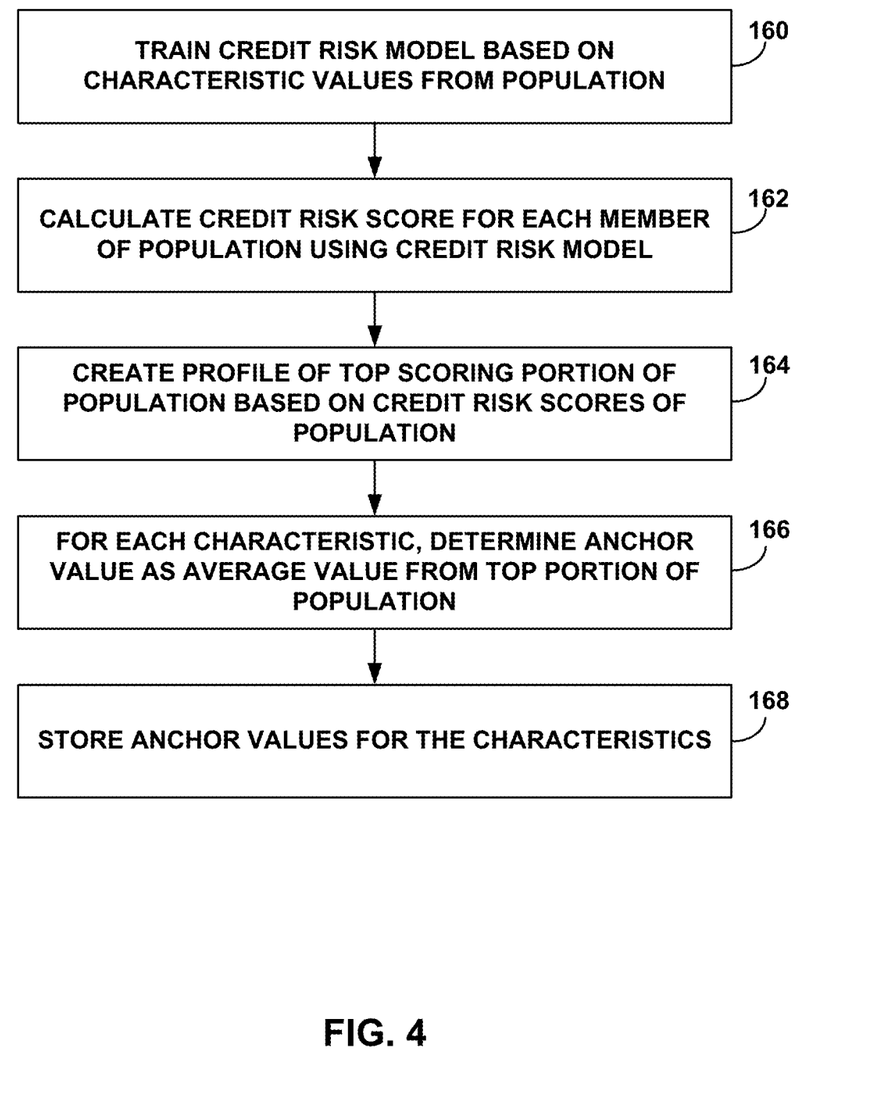
FIG. 4 is a flow chart illustrating an example operation of building a credit risk model and determining characteristic anchor values for the credit risk model, in accordance with techniques of this disclosure.

FIG. 4 is a flow chart illustrating an example operation of building a credit risk model and determining characteristic anchor values for the credit risk model, in accordance with techniques of this disclosure. The example operation is described with respect to credit evaluation system 108 from FIGS. 1 and 2.

Training unit 130 of risk model unit 110 is configured to train credit risk model 132 based on the set of training data 103 that includes values for a plurality of characteristics from a population of consumers (160). Credit risk model 132 may comprise a machine learning-based model that is built from a machine learning algorithm and/or a computer framework for a machine learning algorithm, such as a gradient boosting algorithm, a random forest algorithm, or an ANN, as a few examples. As one example, credit risk model 132 may be built using a gradient boosting algorithm and more than sixty different credit profile characteristics. Once credit risk model 132 is trained, credit risk scoring unit 134 uses credit risk model 132 to calculate a credit risk score for each member of the population based on the values for the plurality of characteristics for the respective member from the population of consumers (162). Anchor generation unit 136 creates a profile of the top scoring portion of the population based on the credit risk scores of the population (164). In one example, the top scoring portion of the population may comprise a top scoring 1% of the population. In other examples, the top scoring portion of the population may comprise a different percentage of the population.

Anchor generation unit 136 then determines an anchor value for each characteristic of the plurality of characteristics assessed by credit risk model 132 as an average value for the respective characteristic from the top scoring portion of the population of consumers used to train credit risk model 132 (166). The average value for the respective characteristic comprises one of a mean or a mode of values for the respective characteristic from the top scoring portion of the population based on whether the respective characteristic is a continuous variable or a categorical variable. Anchor generation unit 136 may store the anchor values 127 for the characteristics assessed by credit risk model 132 to memory 126 (168). Anchor values 127 for credit risk model 132 may be used as "best values" against which to compare applicant values that are scored using the same credit risk model 132 to identify principal adverse action factors for denying the credit request of the applicant, as described in more detail with respect to FIG. 5.

Figure 5:
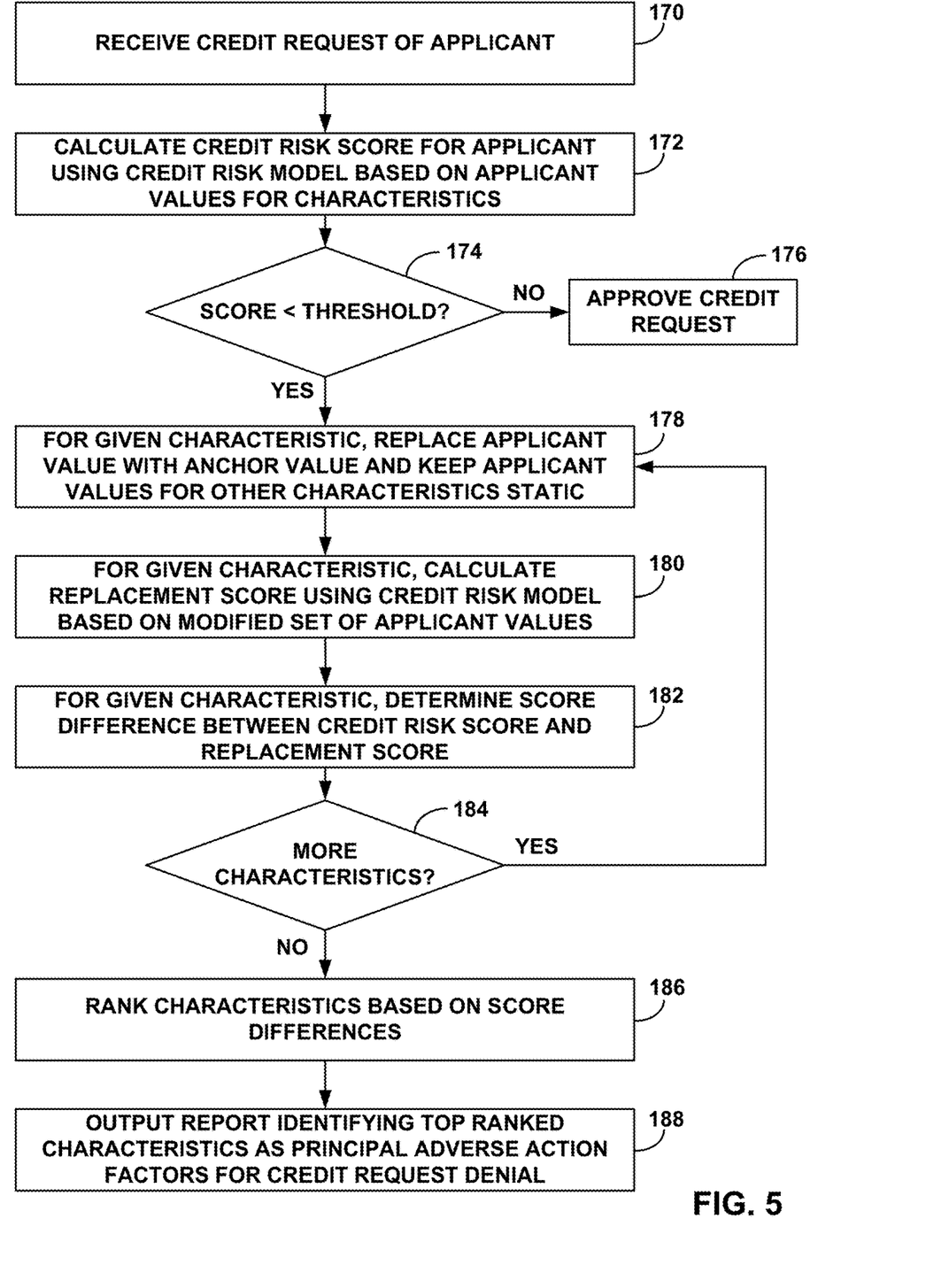
FIG. 5 is a flow chart illustrating an example operation of assessing an applicant's credit profile and identifying adverse action factors for a denial of the applicant's credit request, in accordance with techniques of this disclosure.

FIG. 5 is a flow chart illustrating an example operation of assessing an applicant's credit profile and identifying adverse action factors for a denial of the applicant's credit request, in accordance with techniques of this disclosure.

The example operation is described with respect to credit evaluation system 108 from FIGS. 1 and 2.

Credit evaluation system 108 receives a credit request of an applicant, e.g., a user of one of user devices 116 from FIG. 1 (170). In some examples, credit evaluation system 108 may retrieve the credit profile of the applicant from credit profiles 104 in database 102 from FIG. 1. In other examples, credit evaluation system 108 may receive the credit profile of the applicant either directly from the one of user devices 116 of the applicant and store the applicant's credit profile in memory 126. Credit risk scoring unit 134 uses credit risk model 132 to calculate a credit risk score for the applicant based on a credit profile of the applicant that includes applicant values for a plurality of characteristics assessed by credit risk model 132 (172). Credit risk model 132 may be a machine learning-based model that is trained based on values for a plurality of characteristics from a population of consumers, as described with respect to FIG. 4. Credit risk scoring unit 134 may store the credit risk score for the applicant as one of applicant scores 128 in memory 126.

Based on the credit risk score for the applicant being greater than or equal to a credit approval threshold (NO branch of 174), risk model unit 110 approves the credit request of the applicant (176). Conversely, based on the credit risk score for the applicant being less than a credit approval threshold (YES branch of 174), risk model unit 110 denies the credit request of the applicant and determines one or more adverse action factors for the denial.

In order to determine the adverse action factors, adverse action unit 138 creates a modified set of applicant values for a given characteristic of the plurality of characteristics assessed by credit risk model 132 by replacing the applicant value for the respective characteristic with the anchor value 127 for the respective characteristic while keeping the applicant values for the other characteristics static (178). The anchor value 127 for the respective characteristic comprises a "best value" for the respective characteristic from a top scoring credit profile. Adverse action unit 138 uses credit risk model 132 to calculate a replacement score for the given characteristic based on the modified set of applicant values (180). Adverse action unit 138 then determines a score difference for the given characteristic by subtracting the credit risk score 128 for the applicant from the replacement score for the respective characteristic (182).

If there are more characteristics of credit risk model 132 to analyze (YES branch of 184), adverse action unit 138 repeats steps (178)-(182) for the next characteristic. Once all of the characteristics assessed by credit risk model 132 are analyzed (NO branch of 184), adverse action unit 138 ranks the characteristics assessed by credit risk model 132 based on the score differences (186). More specifically, adverse action unit 138 ranks the characteristics in order of descending magnitude of the score differences such that the one or more characteristics having the largest score differences are identified as the one or more principal adverse action factors for denying the credit request of the applicant. As one example, the top four ranked characteristics may be identified as the principal adverse action factors. Adverse action unit 138 outputs the characteristic ranking for the applicant to reporting unit 112. In some examples, adverse action unit 138 may store the characteristic ranking for the applicant in memory 127.

Reporting unit 112 outputs a report identifying the one or more top ranked characteristics of the plurality of characteristics as the one or more principle adverse action factors for denying the credit request of the applicant (188). In some examples, interfaces 124 of credit evaluation system 108 may transmit the adverse action report to the one of user devices 116 of the applicant and/or for storage in the one of credit profiles 104 of the applicant in database 102 from FIG. 1. In other examples, interfaces 124 of credit evaluation system 108 may transmit the adverse action report to one or more regulatory agencies along with a notification of the denial of the applicant's credit request.

In one or more examples, the functions described may be implemented in hardware, software, firmware, or any combination thereof If implemented in software, the functions may be stored on or transmitted over a computer-readable medium as one or more instructions or code, and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry, as well as any combination of such components. Accordingly, the term "processor," as used herein may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless communication device or wireless handset, a microprocessor, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
   creating a set of training data that includes values for a plurality of characteristics from a population of consumers;
   building a credit risk model maintained by a computing system including training a machine learning algorithm based on the set of training data;
   calculating, by the credit risk model, a credit risk score for one or more members of the population of consumers based on the values for the plurality of characteristics for each of the one or more members of the population of consumers;
   creating a top scoring credit profile of a top scoring portion of the population of consumers based on the credit risk scores for the one or more members of the population of consumers;
   receiving, by the computing system, a credit request of an applicant;
   calculating, by the credit risk model, a credit risk score for the applicant as output from the credit risk model based on applying a credit profile of the applicant as input to the credit risk model, wherein the credit profile includes applicant values for the plurality of characteristics assessed by the credit risk model, wherein the credit risk model is opaque such that a particular weight that a given characteristic of the plurality of characteristics contributed to the credit risk score for the applicant cannot be determined directly from the credit risk model;
   in response to a denial of the credit request of the applicant, determining one or more principal adverse action factors for the denial of the credit request of the applicant, wherein determining the one or more principal adverse action factors comprises:
      determining, by the computing system, an anchor value for each characteristic of the plurality of characteristics assessed by the credit risk model as an average value for the respective characteristic from the top scoring credit profile of the population of consumers used to create the training data used to build the credit risk model, wherein determining a first anchor value for a first characteristic comprises determining a first average value for the first characteristic from the top scoring credit profile;
      creating, by the computing system, a modified set of applicant values for each characteristic of the plurality of characteristics, wherein creating a first modified set of applicant values for the first characteristic of the plurality of characteristics includes replacing a first applicant value for the first characteristic with the first anchor value for the first characteristic while keeping the applicant values for the other characteristics static, calculating, by the credit risk model, a plurality of replacement scores for the plurality of characteristics, wherein each replacement score corresponds to a respective characteristic of the plurality of characteristics, wherein a first replacement score for the first characteristic is calculated as output from the credit risk model based on applying the first modified set of applicant values for the first characteristic as input to the credit risk model, ranking, by the computing system, each characteristic of the plurality of characteristics based on a score difference between the credit risk score for the applicant and each replacement score of the plurality of replacement scores, wherein a first score difference between the credit risk score for the applicant and the first replacement score for the first characteristic indicates a first particular weight that the first characteristic contributed to the credit risk score of the applicant, and determining the one or more principal adverse action factors for the denial of the credit request of the applicant as one or more top ranked characteristics of the plurality of characteristics; and outputting, by the computing system, a report identifying the one or more top ranked characteristics of the plurality of characteristics as the one or more principal adverse action factors for the denial of the credit request of the applicant.

2. The method of claim 1, wherein the first average value for the first characteristic comprises one of a mean or a mode of values for the first characteristic from the top scoring credit profile based on whether the first characteristic is a continuous variable or a categorical variable.

3. The method of claim 1, further comprising determining the score difference for each characteristic of the plurality of characteristics by subtracting the credit risk score for the applicant from the replacement score for the respective characteristic.

4. The method of claim 1, wherein ranking each characteristic of the plurality of characteristics comprises ranking the characteristics in order of descending magnitude of score differences, and wherein the one or more characteristics having largest score differences are identified as the one or more principal adverse action factors for denying the credit request of the applicant.

5. The method of claim 1, further comprising, based on the credit risk score for the applicant being less than a credit approval threshold, denying the credit request of the applicant.

6. The method of claim 1,
wherein creating a second modified set of applicant values for a second characteristic of the plurality of characteristics includes replacing a second applicant value for the second characteristic with a second anchor value for the second characteristic while keeping the applicant values for the other characteristics, including the first applicant value for the first characteristic, static, and wherein the second anchor value for the second characteristic comprises a value for the second characteristic from the top scoring credit profile of the population of consumers used to build the credit risk model;
wherein calculating a second replacement score for the second characteristic includes calculating the second replacement score as output from the credit risk model based on applying the second modified set of applicant values for the second characteristic as input to the credit risk model;

wherein ranking each characteristic of the plurality of characteristics comprises:
determining the first score difference between the credit risk score for the applicant and the first replacement score for the first characteristic, wherein the first score difference indicates the first particular weight that the first characteristic contributed to the credit risk score of the applicant,
determining a second score difference between the credit risk score for the applicant and the second replacement score for the second characteristic, wherein the second score difference indicates a second particular weight that the second characteristic contributed to the credit risk score of the applicant, wherein the second score difference is larger than the first score difference, and
ranking the first characteristic and the second characteristic in order of descending magnitude of the first score difference and the second score difference, wherein at least the second characteristic having the second score difference that is larger than the first score difference is identified as a top ranked characteristic of the plurality of characteristics;
wherein determining the one or more principal adverse action factors comprises determining at least the second characteristic as a principal adverse action factor for denying the credit request of the applicant; and
wherein outputting the report comprises outputting the report identifying at least the second characteristic as the principal adverse action factor for the denial of the credit request of the applicant.

7. A computing system comprising:
a memory;
a credit risk model comprising a machine learning-based model; and
one or more processors in communication with the memory and configured to:
create a set of training data that includes values for a plurality of characteristics from credit profiles of a population of consumers;
train a machine learning algorithm to build the credit risk model based on the set of training data;
calculate, using the credit risk model, a credit risk score for one or more members of the population of consumers based on the values for the plurality of characteristics of each of the one or more members of the population of consumers;
create a top scoring credit profile of a top scoring portion of the population of consumers based on the credit risk scores for the one or more members of the population of consumers;
receive a credit request of an applicant;
calculate, using the credit risk model, a credit risk score for the applicant as output from the credit risk model based on applying a credit profile of the applicant as input to the credit risk model, wherein the credit profile includes applicant values for the plurality of characteristics assessed by the credit risk model, wherein the credit risk model is opaque such that a particular weight that a given characteristic of the plurality of characteristics contributed to the credit risk score for the applicant cannot be determined directly from the credit risk model;
in response to a denial of the credit request of the applicant, determine one or more principal adverse action factors for the denial of the credit request of the applicant, wherein to determine the one or more principal adverse action factors, the one or more processors are configured to:
  determine an anchor value for each characteristic of the plurality of characteristics assessed by the credit risk model as an average value for the respective characteristic from the top scoring credit profile of the population of consumers used to create the training data used to build the credit risk model, wherein to determine a first anchor value for a first characteristic, the one or more processors are configured to determine a first average value for the first characteristic from the top scoring credit profile;
  create a modified set of applicant values for each characteristic of the plurality of characteristics, wherein to create a first modified set of applicant values for the first characteristic of the plurality of characteristics, the one or more processors are configured to replace a first applicant value for the first characteristic with the first anchor value for the first characteristic while keeping the applicant values for the other characteristics static,
  calculate, using the credit risk model, a plurality of replacement scores for the plurality of characteristics, wherein each replacement score corresponds to a respective characteristic of the plurality of characteristics, wherein the one or more processors are configured to calculate a first replacement score for the first characteristic as output from the credit risk model based on applying the first modified set of applicant values for the first characteristic as input to the credit risk model,
  rank each characteristic of the plurality of characteristics based on a score difference between the credit risk score for the applicant and each replacement score of the plurality of replacement scores, wherein a first score difference between the credit risk score for the applicant and the first replacement score for the first characteristic indicates a first particular weight that the first characteristic contributed to the credit risk score of the applicant, and
  determine the one or more principal adverse action factors for the denial of the credit request of the applicant as one or more top ranked characteristics of the plurality of characteristics; and
  output a report identifying the one or more top ranked characteristics of the plurality of characteristics as the one or more principal adverse action factors for the denial of the credit request of the applicant.

8. The computing system of claim 7, wherein to rank each characteristic of the plurality of characteristics, the one or more processors are configured to rank the characteristics in order of descending magnitude of score differences, and wherein the one or more characteristics having largest score differences are identified as the one or more principal adverse action factors for denying the credit request of the applicant.

9. A non-transitory computer readable medium comprising instructions that when executed cause one or more processors to:
  create a set of training data that includes values for a plurality of characteristics from credit profiles of a population of consumers;
  train a machine learning algorithm to build a credit risk model based on the set of training data;
  calculate, using the credit risk model, a credit risk score for one or more members of the population of consumers based on the values for the plurality of characteristics of each of the one or more members of the population of consumers;
  create a top scoring credit profile of a top scoring portion of the population of consumers based on the credit risk scores for the one or more members of the population of consumers;
  receive a credit request of an applicant;
  calculate, using the credit risk model, a credit risk score for the applicant as output from the credit risk model based on applying a credit profile of the applicant as input to the credit risk model, wherein the credit profile includes applicant values for the plurality of characteristics assessed by the credit risk model, wherein the credit risk model is opaque such that a particular weight that a given characteristic of the plurality of characteristics contributed to the credit risk score for the applicant cannot be determined directly from the credit risk model;
  in response to a denial of the credit request of the applicant, determine one or more principal adverse action factors for the denial of the credit request of the applicant, wherein to determine the one or more principal adverse action factors, the instruction cause the one or more processors to:
    determine an anchor value for each characteristic of the plurality of characteristics assessed by the credit risk model as an average value for the respective characteristic from the top scoring credit profile of the population of consumers used to create the training data used to build the credit risk model, wherein to determine a first anchor value for a first characteristic, the instructions cause the one or more processors to determine a first average value for the first characteristic from the top scoring credit profile;
    create a modified set of applicant values for each characteristic of the plurality of characteristics, wherein creating a first modified set of applicant values for the first characteristic of the plurality of characteristics includes replacing an applicant value for the first characteristic with the first anchor value for the first characteristic while keeping the applicant values for the other characteristics static,
    calculate, using the credit risk model, a plurality of replacement scores for the plurality of characteristics, wherein each replacement score corresponds to a respective characteristic of the plurality of characteristics, wherein a first replacement score for the first characteristic is calculated as output from the credit risk model based on applying the first modified set of applicant values for the first characteristic as input to the credit risk model,
    rank each characteristic of the plurality of characteristics based on a score difference between the credit risk score for the applicant and each replacement score of the plurality of replacement scores, wherein a first score difference between the credit risk score for the applicant and the first replacement score for the first characteristic indicates a first particular weight that the first characteristic contributed to the credit risk score of the applicant, and
    determine the one or more principal adverse action factors for the denial of the credit request of the applicant as one or more top ranked characteristics of the plurality of characteristics; and
  output a report identifying the one or more top ranked characteristics of the plurality of characteristics as the one or more principal adverse action factors for the denial of the credit request of the applicant.

10. The computing system of claim 7,
wherein to create a second modified set of applicant values for a second characteristic of the plurality of characteristics, the one or more processors are configured to replace a second applicant value for the second characteristic with a second anchor value for the second characteristic while keeping the applicant values for the other characteristics, including the first applicant value for the first characteristic, static, and wherein the second anchor value for the second characteristic comprises a value for the second characteristic from the top scoring credit profile of the population of consumers used to build the credit risk model;
wherein the one or more processors are configured to calculate a second replacement score for the second characteristic as output from the credit risk model based on applying the second modified set of applicant values for the second characteristic as input to the credit risk model;
wherein to rank each characteristic of the plurality of characteristics, the one or more processors are configured to:
determine the first score difference between the credit risk score for the applicant and the first replacement score for the first characteristic, wherein the first score difference indicates the first particular weight that the first characteristic contributed to the credit risk score of the applicant,
determine a second score difference between the credit risk score for the applicant and the second replacement score for the second characteristic, wherein the second score difference indicates a second particular weight that the second characteristic contributed to the credit risk score of the applicant, wherein the second score difference is larger than the first score difference, and
rank the first characteristic and the second characteristic in order of descending magnitude of the first score difference and the second score difference, wherein at least the second characteristic having the second score difference that is larger than the first score difference is identified as a top ranked characteristic of the plurality of characteristics;
wherein to determine the one or more principal adverse action factors the one or more processors are configured to determine at least the second characteristic as a principal adverse action factor for denying the credit request of the applicant; and
wherein to output the report, the one or more processors are configured to output the report identifying at least the second characteristic as the principal adverse action factor for the denial of the credit request of the applicant.

* * * * *